June 23, 1953  V. R. HARSHMAN  2,642,691
ILLUMINATED FLOATING FISHING BOBBER
Filed June 2, 1950
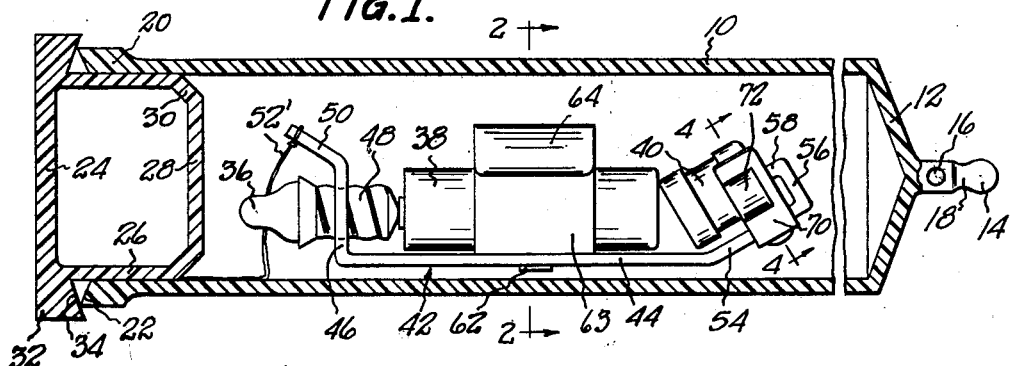
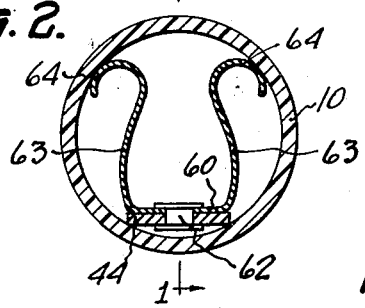
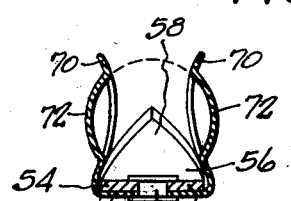
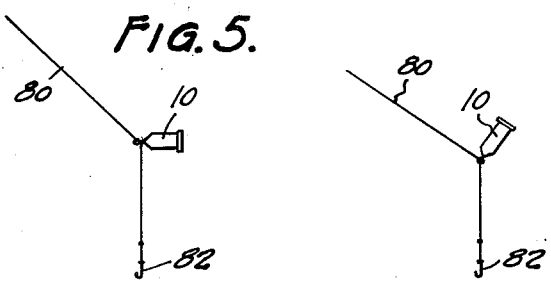
INVENTOR.
VIRGIL R. HARSHMAN
BY
Oltsch & Knoblock
ATTORNEYS.

Patented June 23, 1953

2,642,691

UNITED STATES PATENT OFFICE 2,642,691

ILLUMINATED FLOATING FISHING BOBBER

Virgil R. Harshman, South Bend, Ind.

Application June 2, 1950, Serial No. 165,767

3 Claims. (Cl. 43—17)

This invention relates to floating fishing bobbers, and more particularly to a bobber provided with illuminating means operated in response to the predetermined angular positioning of the bobber and serving as a signal or tell-tale, when illuminated, to alert the angler to the fact that a fish has struck the tackle to which the bobber is connected.

The primary object of the invention is to provide a device of this character which is simple, inexpensive and easy to make and to assemble.

A further object is to provide a device of this character with illuminating means mounted upon a bracket to constitute a preassembled unit adapted to be inserted and removed from a casing easily, quickly and readily, and wherein the bracket is so constructed that a constant pressure is exerted upon the various electrical components to maintain a constant and good electrical contact between said components at all times.

A further object is to provide a device of this character with an illuminating unit preassembled and adjustable lengthwise of the housing to any selected position to control the angle at which the buoyant casing thereof is positioned within the water and thereby control the amount of angular movement which is required and the resistance to such angular movement which is provided by the device in its operation when a fish strikes a fisherman's tackle.

Other objects will be apparent from the following specification which is to be considered with the drawings in which Fig. 1 is a longitudinal sectional view taken on line 1—1 of Fig. 2.

Fig. 2 is a transverse sectional view taken on line 2—2 of Fig. 1.

Fig. 3 is a top plan view of the assembly constituting the illuminating unit.

Fig. 4 is a transverse sectional view taken on line 4—4 of Fig. 1.

Fig. 5 is a schematic view illustrating the position in which the bobber normally rides in the water when connected with a fishing line.

Fig. 6 is a view illustrating the tilting of the bobber when a pull is exerted upon the fishing line.

Referring to the drawing which illustrates the preferred embodiment of the invention, the numeral 10 designates a casing which is open at one end and closed at its opposite end by an end wall 12. A stem 14 preferably has one or more cross bores 16 therein and may have a circumferential groove 18 intermediate its ends. The casing 10 may be formed of any material found suitable. One material particularly well suited for the device is synthetic resin or plastic material preferably of the translucent type either pigmented or plain. However, the use of synthetic resins or of translucent material is not essential and the casing may be formed of metal, glass or of any other material found suitable. The open end of the casing 10 preferably has a flange 20 formed therein, and the end edge surface 22 is preferably frusto conical, as best seen in Fig. 1.

Any means found suitable may serve as a closure for the end of the casing 10. Said closure, however, particularly in the case where the casing 10 is opaque, should be formed of translucent material. One form of closure which I have found particularly suitable for this construction is illustrated herein and constitutes a hollow body having an outer end wall 24, a substantially cylindrical wall portion 26 characterized by a tendency in its normal form to bulge slightly at its center, that is, to be of slightly greater diameter at its midlength portion than at its opposite end portions, and an end wall 28 preferably defined in part by a frusto conical marginal portion 30. A circumferential flange 32 projects from the closure adjacent the end wall 24 and is preferably provided with a frusto conical inner surface 34.

This closure is formed unitarily as by molding and is preferably formed from synthetic resin material having a certain amount of flexibility or resilience. The device is so constructed that it will tend normally to assume its proper shape but will be subject to a slight degree of deflection upon the application of pressure. The outer diameter of the cylindrical portion 26 adjacent the opposite ends thereof will preferably be substantially equal to the inner diameter of the tubular casing 10 adjacent its mouth so that the midlength portion of the cylindrical wall 26 will be of a diameter slightly greater than the inner diameter of the casing 10. The construction will be such, therefore, that when the end closure is forced into the end of the tube an effective seal is provided, the flexibility and resilience of the end closure serving to insure a continuous circumferential sealing engagement of the wall 26 with the wall of the casing 10. This sealing engagement is supplemented by the line contact provided between the surfaces 22 and 34 which have a line sealing effect between the outer end of the casing 10 and the flange 32 of the closure. The closure is readily removable. It will be understood, of course, that this closure construction, while preferred, is not essential and it is intended merely to illustrate all closures which may be used with elongated tubular bodies to provide a releasable sealed unit or bobber body characterized at least in part by a translucent portion or portions.

Within the hollow sealed chamber or container is mounted illuminating means, which means include an electric lamp or light bulb 36, a battery 38 and a control switch 40. These parts are all secured together in a unitary assembly by means of a bracket 42. The bracket 42 is preferably formed from a rigid metal plate or band 44 elongated in character and of a width narrow compared to the inner diameter of the casing 10. One end of the band 44 has a portion 46 bent substantially perpendicularly therefrom, and within this portion 46 is formed an opening of such a size and shape and contour that the threaded shank 48 of a light bulb 36 may be screw-threaded therein and held thereby in any selected threaded adjustment with its axis substantially perpendicular to the portion 46. The end portion 50 of the band is bent forwardly from the portion 46, as best seen in Fig. 1, and preferably has an aperture 52 formed therein at which a cord, a thread or similar elongated flexible member 52' may be connected, as illustrated in Fig. 1. The terminal portion 50 of the band 44 will preferably be of tapered shape, as best seen in Fig. 3.

The opposite end portion of the band 44 is bent at 54 at an acute angle to portion 44. A substantially right-angled bend at the end of the portion 54 provides a transverse portion 56 extending substantially perpendicularly to portion 54, and another bend at the end portion 56 defines a return bent portion 58. The portion 58 preferably tapers to a point, as best seen in Fig. 3, and is spaced laterally from and substantially parallel to the portion 54.

Intermediate the ends of the band portion 44 a leaf spring is anchored thereto. The construction of the parts is best illustrated in Fig. 2 from which it will be seen that the central portion 60 of the spring is fixedly secured to the band 44 to extend crosswise or perpendicularly of said band. Any suitable means may be used to secure the spring portion 60 to the band portion 44, a rivet 62 having been chosen for purposes of illustration. Any other securing means found suitable may be employed, however. The spring band projects upwardly and outwardly to provide spring arms 63 at opposite sides of the plate 44, these arms preferably being curved or bent, as best seen in Fig. 2. The arms are elongated and terminate in curled or rolled end portions 64. The spring parts 60—64 are of such size and are so related to the plate 44 and the inner diameter of the casing 10 that a snug spring fit of the parts is provided, as best seen in Fig. 2. The spring band 60—64 will be of a width to engage a substantial portion of the length of the casing 10, as best seen in Fig. 1, and will cooperate with the flat elongated portion 44 of the bracket band to insure non-tilting mounting of that bracket band within the casing.

A spring clamp is carried by the portion 54 of the bracket band, and, as best illustrated in Fig. 4, constitutes an elongated resilient metal strip or leaf spring having a portion 66 which is secured to the band portion 44 by any suitable means, here shown as a rivet 68, although any other suitable means may be employed. The opposite end portions 70 of the spring are of generally curved or substantially arcuate shape with the convex faces extending inwardly and being spaced apart a distance substantially less than the diameter of the switch member 40. These arms 70 are interrupted by portions 72 bent to arcuate form with their inner faces concave and bent about a radius substantially equal to the radial dimension of the switch 40. The portions 72 are of reduced width, compared to the width of the spring arms 70, and are formed therefrom preferably by forming a slit in the arms 70 extending longitudinally of those arms at a selected lateral position thereof, so that the portion of the arms on one side of that slit may be bent to form the parts 72 while the remaining portions of the arms 70 are oppositely curved.

The clamp 66—72 provides means for gripping the switch 40. The switch 40 preferably is a mercury switch of the type having a tubular body portion 76 formed of a non-conductive or dielectric material, such as paper, or ceramic material. Metal end caps 78 are secured fixedly at opposite ends of the non-conductive tube 76. A small quantity of mercury is confined within the sheath defined by the parts 78—76, the quantity being sufficiently small that when the sheath is tilted in the position substantially as illustrated in Fig. 1, the mercury will contact only one of the end caps 78; but, when the sheath has its axis positioned at or close to horizontal, the mercury will spread to contact both of the end caps 78 and will form an electrical conductor therebetween.

When the spring clamps have been secured to the bracket 42, they will constitute a bracket assembly adapted to position the lamp 36, the battery 38 and the switch 40 in operative position, assuming, of course, that the shank 48 of the light bulb 36 is threaded in its opening in the bracket part 46 to press the parts into contact longitudinally. This enables ready assembly of the illuminating parts exteriorly of the casing as a complete unit, and their handling for purposes of insertion in and removal from the casing simply and expeditiously. It will be observed in this connection that the spring clip 60—64 serves to position the battery 38 to extend lengthwise of the bracket 42. The spring clamp 66—72 serves as means to grip and position the switch 40. The pointed part 58 cooperates with the spring 66—70 to insure good electrical contact between the outer end cap 78 of the switch and the bracket 42. This part 58 also serves as means to prevent endwise movement of the switch 40. After the switch 40 and the battery 38 have been mounted upon the bracket as above mentioned, threading of the shank 48 of the lamp 36 into its receiving opening in the part 46 of the bracket will apply longitudinal pressure upon the electrical components to insure an effective electrical contact between the terminals of the lamp and the battery and between the inner cap 78 of the switch and the opposite end of the battery and this electrical contact will be thereafter positively maintained.

The assembly so arranged is positioned within the container by simply inserting it into the container. This will necessitate slight compression or inward deforming of the spring 60—64 and the expansion of that spring will serve to press the longitudinal edges of the part 44 of the bracket firmly against the inner wall of the casing 10 along substantially the full length of the member 44. Thus the parts are held frictionally in desired relation or position, and the friction fit will preferably be sufficient to prevent longitudinal or rotative displacement of the bracket and its electrical components relative to the casing. This stability of position will in turn provide means by which the attitude of the float within the water may vary. In other words, this will provide means for maintaining the position of the center of gravity of the complete bobber as desired. Consequently, it will control the attitude at which the bobber floats in the water while at rest, either assuring a flat riding of the casing in the water or positioning one or the other of the two ends of the bobber in somewhat elevated position relative to the other.

In use the bobber is attached to the line 80 at the shank 14 of the body, as illustrated, spaced from the hook 82 a distance dependent upon the depth at which it is desired to fish. The bobber body will float upon the surface of the water normally in the position illustrated in Fig. 5 or in such other position as the longitudinal location of its center of gravity determines. This normally floating position will, however, be such that the light bulb 36 will be inoperative because the circuit thereto is open at the switch 40. In other words, the casing 10 will ride in the water at such an angle that the mercury within the casing 76 will contact only one end cap 78 and, consequently, no circuit will be closed through the electrical component. When the unit is tilted, for example as illustrated in Fig. 6, with its stud carrying end 14 connected to the line positioned lowermost, the tilting action will serve to tilt the switch 40 to such a position that the mercury contained within the switch 40 will complete an electrical contact between the end caps 78 of the switch and thus will close a circuit from the battery to the lamp, thence through the bracket to the switch 40, and in turn back to the battery. In this connection it will be observed that the bracket must mount the switch 40 so that only one end cap is contacted by the bracket. This arrangement is illustrated in Fig. 1 and is accomplished by the combined action of the gripping and positioning of the switch by the parts 72 of the arm coupled the bending of the parts in such a manner that the tendency of the battery in pressing against the switch will be such as to tend to move that end away from the bracket. This is determined in part by the relation of the various parts to one another, and, particularly, is determined by the angle at which the plate 54 is bent, the point at which the part 58 contacts the outer end of the switch, and the location of the point of contact of the switch 40 with the battery. Those points are so arranged that as longitudinal pressure is applied, a tendency exists to cause the switch 40 to be moved into axial alignment with the battery rather than to be moved to a greater angular displacement relative to the battery.

While the preferred embodiment of the invention has been illustrated and described herein, it will be understood that changes in the construction may be made within the scope of the appended claims without departing from the spirit of the invention.

I claim:

1. An illuminated fishing bobber comprising a hollow sealed elongated buoyant body having at least a part thereof formed of translucent material and including a removable closure member, an electrically conductive bracket unit including an elongated portion and a pair of spring clamps, a battery gripped by one clamp, a mercury switch carried by the other clamp in angular relation to the length of said body, said bracket unit including a transverse apertured end portion, and a light bulb carried by said apertured end portion, said bracket unit maintaining said battery, switch and light bulb in electrical contact, said battery-gripping clamp including outwardly projecting parts spaced laterally from said elongated bracket portion and from each other in proportion to the dimensions of the interior of the body whereby they frictionally engage said body and press said elongated bracket portion against said body and thereby provide at least three circumferentially spaced contact points between said brackets and body to maintain said bracket unit in selected position in said body.

2. An illuminating unit for a buoyant hollow bobber body, comprising an elongated rigid metal bracket, electrical components including a light bulb, a battery, and a tilt switch, and a plurality of longitudinally spaced carrier members on said bracket each mounting one of said electrical components in circuit-making contact with each other and with said bracket and constituting therewith a preformed assembly, said battery carrier constituting a substantially U-shaped member formed of resilient sheet material secured at its central portion to said bracket, the opposite portions of said battery carrier being curved to grip a battery therebetween at their concave faces and terminating in oppositely curved outwardly bent ends, said curved ends projecting outwardly of said battery and being adapted to engage said body and press said carrier against said body.

3. A device of the construction defined in claim 2, wherein a portion of said bracket at one end projects angularly and has a return bent end portion, said switch carrier constituting a substantially U-shaped resilient clamp secured at its central portion to said angular bracket portion to position said switch substantially parallel to said angular bracket portion and in contact with said return bent portion.

VIRGIL R. HARSHMAN.

References Cited in the file of this patent

UNITED STATES PATENTS

| Number | Name | Date |
| --- | --- | --- |
| 1,982,609 | Freese | Nov. 29, 1934 |
| 2,146,237 | Stephens | Feb. 7, 1939 |
| 2,236,071 | Roskam et al. | Mar. 25, 1941 |
| 2,280,457 | Sutcliffe | Apr. 21, 1942 |
| 2,464,309 | Harshman | Mar. 15, 1949 |
| 2,549,404 | Williams | Apr. 17, 1951 |